United States Patent [19]
Haines et al.

[11] 3,912,081

[45] Oct. 14, 1975

[54] CHILD RESISTANT PACKAGE

[75] Inventors: Russell R. Haines, Cherry Hill; Walter Zimmerman, Ocean Gate, both of N.J.

[73] Assignee: Paco Packaging, Inc., Pennsauken, N.J.

[22] Filed: Jan. 23, 1974

[21] Appl. No.: 436,021

[52] U.S. Cl. .................. 206/531; 206/484; 206/498
[51] Int. Cl.² ................. B65D 83/04; B65D 75/42; B65D 85/56
[58] Field of Search ............ 206/42, 498, 484, 531, 206/532; 116/121

[56] References Cited
UNITED STATES PATENTS

| | | | |
|---|---|---|---|
| 3,305,077 | 2/1967 | Greif et al. | 206/42 |
| 3,397,671 | 8/1968 | Hartman, Jr. et al. | 206/42 |
| 3,650,391 | 3/1972 | Chung | 206/498 |
| 3,682,366 | 8/1972 | Chung | 206/498 |
| 3,809,221 | 5/1974 | Compere | 206/42 |

Primary Examiner—William T. Dixson, Jr.
Attorney, Agent, or Firm—Seidel, Gonda & Goldhammer

[57] ABSTRACT

A package having a data layer bonded to a laminate containing a product pocket which projects through a hole in the data layer is disclosed. The bond strength between first and second layers of the laminate is less than the bond strength between second and third layers of the laminate. Access to a product in the pocket is attained by separating the first and second layers of the laminate and pushing the product through the second laminate layer.

11 Claims, 6 Drawing Figures

U.S. Patent  Oct. 14, 1975  3,912,081
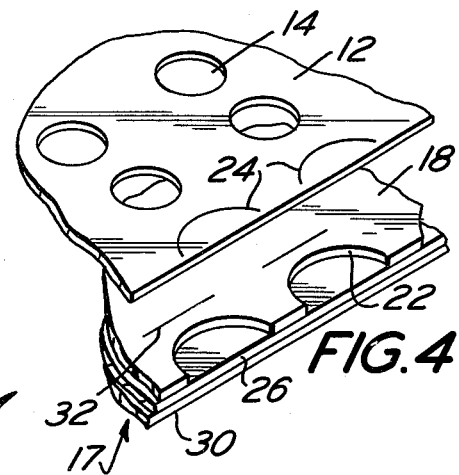
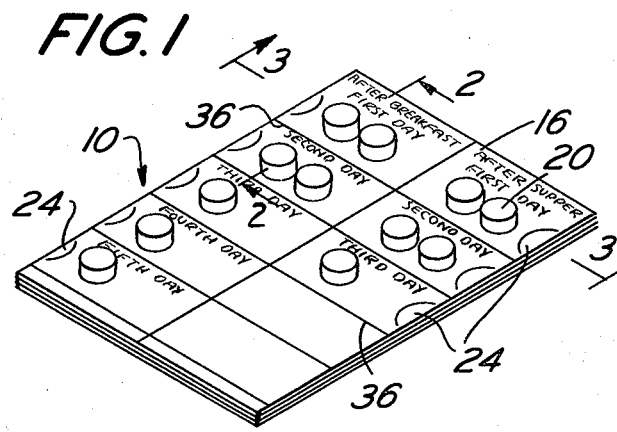
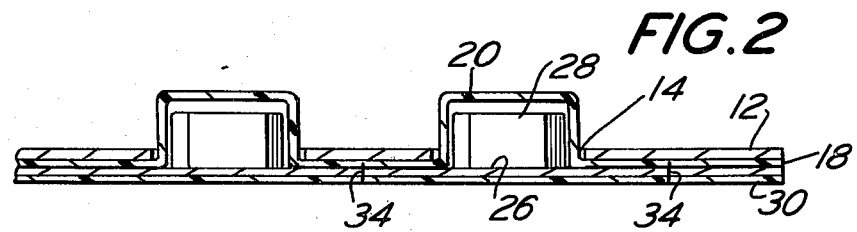
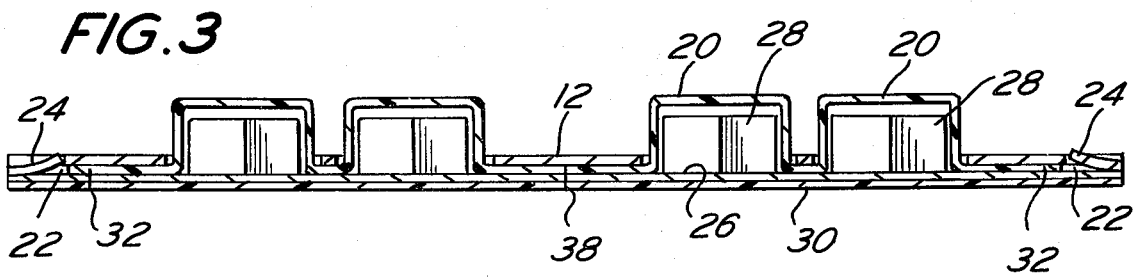
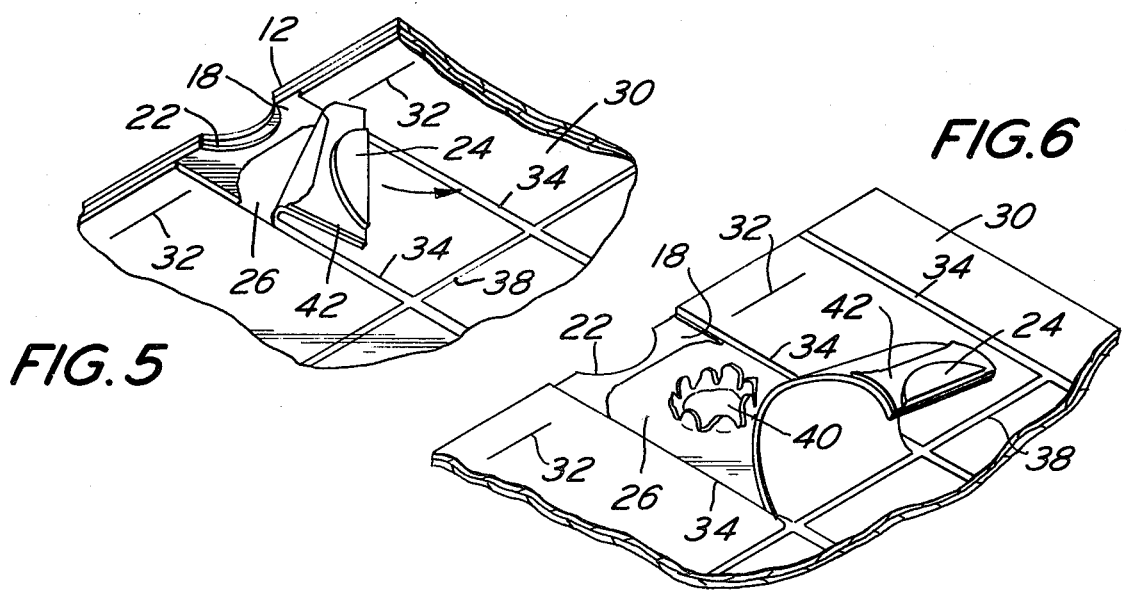

CHILD RESISTANT PACKAGE

DISCLOSURE

This invention relates to a child resistant package, namely a package which is of the single dosage type and difficult for children to attain access to the product. In addition, the integrity of the data printed on the package is not destroyed when access is attained to a product thereby providing a reminder for dosage taken and for dosage to be taken. For example, the package may include a plurality of pockets with data adjacent each pocket indicative of a time period such as first day, second day, third day, etc. At a mere glance, the package reveals empty pockets and full pockets thereby indicating the dosage taken and the dosage to be taken.

The package in accordance with the present invention includes a data layer made from a material such as paper having a plurality of holes therein and data printed thereon adjacent the holes. The data layer also includes a tab die cut adjacent an edge of the data layer. A laminate having pockets on a carrier layer is bonded to the data layer in a manner so that the pockets project through the holes in the data layer.

The laminate includes a foil layer juxtaposed to the open side of the pocket in the carrier layer and is bonded to the carrier layer. The laminate also includes a reinforcing layer made from a material having high tear strength such as Mylar. The reinforcing layer is bonded to the foil layer. The bond strength between the reinforcing layer and the foil layer is less than the bond strength between the foil layer and the carrier layer.

The laminate is die cut or perforated so as to divide the same into strips. The tab on the data layer is bonded to the foil layer. Pulling on the tab will peel back a strip of the reinforcing layer thereby exposing the portion of the foil layer juxtaposed to the open side of a pocket. Pushing on the carrier layer pocket will force the product through the foil layer.

It is an object of the present invention to provide a package which contains a product and is constructed in a manner so as to be difficult for a child to attain access to the product.

It is another object of the present invention to provide a child resistant product which contains a permanent record indicative of the sequence of dosage taken and dosage to be taken in the future.

It is another object of the present invention to provide a package in the form of a laminate wherein access to a product is attained as a function of bond strength between adjacent layers of the laminate.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a package in accordance with the present invention.

FIG. 2 is a sectional view taken along the line 2—2 in FIG. 1.

FIG. 3 is a sectional view taken along the line 3—3 in FIG. 1.

FIG. 4 is a partial exploded view of a portion of the package shown in FIG. 1.

FIG. 5 is a partial perspective view of the package shown in FIG. 1 but illustrating the manner in which access is attained to the product.

FIG. 6 is a view similar to FIG. 5 but showing the components of the package after access has been attained.

Referring to the drawing in detail, wherein like numerals indicate like elements, there is shown in FIG. 1 a package in accordance with the present invention designated generally as 10. The package 10 includes a data layer 12 which may be made from paper having a thickness such as .005–.05 inches. The bottom surface of the layer 12 is preferably provided with a heat seal coating. The top surface of the layer 12 has data 16 printed or otherwise applied thereto.

The data 16 includes various printed words associated with one or more holes 14 which extend through the layer 12. The data may include two columns as indicated and preferably is in the form of a dosage schedule such as first day, second day, third day, etc. If a person cannot remember if he is on schedule with respect to a prescribed dosage for a particular product, it is only necessary to visually observe the package 10 which immediately indicates the presence or absence of products in association with the various portions of the data 16. This feature is important to persons who are forgetful and important for use in connection with establishments such as hospitals wherein a different nurse is present in the morning as compared with the afternoon.

The bottom surface of the data layer 12 is bonded to a laminate designated generally as 17 in any convenient manner such as by heat sealing. The laminate 17 includes a carrier layer 18 having pockets 20 integral therewith. Each pocket 20 extends through one of the holes 14 in the data layer 12. The carrier layer 18 may be any one of a wide variety of polymeric plastic materials such as polyvinyl chloride having a thickness of about .007–.015 inches.

The carrier layer 18 is provided with notches 22 along side edges thereof in line with an adjacent pocket 20. The carrier layer 12 is provided with tabs 24 which are die cut or otherwise delineated so as to be generally semicircular and in a location so as to overlie a notch 22, which likewise is generally semicircular.

A foil layer 26, such as aluminum foil, is bonded to the carrier layer 18 and overlies the open side of the pockets 20. Foil layer 18 may be bonded to the carrier layer 18 in any convenient manner such as by heat sealing. As will be apparent in FIG. 4, a portion of the surface of foil layer 26 is exposed through the notches 22 when viewed from above. The foil layer 26 retains the product 28 within the pocket 20.

A reinforcing layer 30 is provided and has the same dimensions or peripheral contour as the foil layer 28. The reinforcing layer 30 is preferably polymeric plastic material having high tear strength such as Mylar whereby access to the product 28 is difficult by biting, tearing or punching through the layer 30.

The reinforcing layer 30 is bonded to the foil layer 26 in a convenient manner such as by use of adhesives or heat sealing. The strength of the bond between layers 30 and 26 is substantially less than the strength of the bond between layers 26 and 18 or the bond between layers 18 and 12. For example, the bond strength between the layers 26 and 18 may be in the nature of 3 pounds per square inch when measured in accordance with commercially accepted testing standards such as ASTM as compared with the bond strength of the seal between layers 30 and 26 which may be on the order of ½ to 1¼ pounds per square inch.

Since the tabs 24 overlie the notches 22 in layer 18, the tabs 24 will be bonded to the upper surface of foil layer 26 when the laminate 17 is bonded to the data layer 12. Access to the product 28 will be attained by pulling on the tab 24 and causing its ends to separate from the data layer 12. In order to prevent the foil layer 26 from separating from the carrier layer 18 except for the small portion of layer 26 beneath the tab 24, a die cut 32 is provided on the laminate 17 adjacent to but opposite each of the notches 22. The die cuts 32 are discontinuous and parallel to the side edges of the package 10.

The laminate 17 is also preferably provided with die cuts 34 which are generally beneath and parallel to the transverse lines 36 printed on the upper surface of the data layer 12. The lines 36 delineate one pocket 20 with associated data 16 from an adjacent pocket and its associated data 16. Hence, the die cuts 34 delineate the reinforcing layer 30 into strips extending from a side edge of the package 10 to a median die cut 38 which is generally equidistant from and parallel to the side edges of the package 10.

The layers 26 and 30 are preferably laminated together as an independent manufacturing step. The layer 26 may be slightly thicker than the layer 30 with the combined thickness of layers 26 and 30 being approximately .0025 inches and a weight of about 62.5 pounds per ream. The layers 26 and 30 can be bonded by application of heat between 300°–375° F. at 40 psi for 1 second and when so bonded will have a bursting strength of about 40 pounds per square inch in accordance with ASTM D-751.

The carrier layer 18 may be vacuum formed to delineate the pockets 20. The products 28 are loaded into the pockets 20 in the prescribed order in the event that one product 28 in one of the pockets 20 is to be different from the product 28 in another of the pockets 20. Thereafter, the lamination of layers 26 and 30 is placed over the carrier layer 12. Then the foil layer 26 is bonded to the carrier layer 12 in any convenient manner such as by heat sealing so that the bond strength therebetween is substantially greater than the bond strength between layers 26 and 30. Simultaneously with the heat sealing of foil layer 26 to the carrier layer 18, or subsequent thereto, the die cuts 32, 34 and 38 are applied. Such die cuts need only extend through the layer 30 but no harm is done if the entire laminate 17 is cut through by the die cuts. The integrity of the laminate 17 as a single manipuable layer is attained since the die cuts 34 and 38 have spaced gaps and hence are in the nature of elongated perforations.

Thereafter, the laminate 17 is juxtaposed to the bottom surface of the data layer 12 and orientated with respect to the same so that the pockets 20 containing the products 28 extend through the holes 14. Thereafter, the carrier layer portion of the laminate 17 is heat sealed or otherwise bonded to the data layer 12. Thereafter, the entire package may be trim cut along its periphery.

Access to the product 28 in one of the pockets 20 is attained as follows. The package 10 is turned over to expose its bottom surface as shown in FIG. 5. The tab 24 is grasped between two fingers and pulled upwardly as shown in FIG. 5 so that the ends of the tab 24 adjacent the edge of layer 12 are separated therefrom. This action may cause a small part 42 of the layer 26 to separate from the carrier layer 18. The die cut 32 assures that the part 42 will be small. Continued peeling of the tab 24 to the position shown in FIG. 6 causes the layer 30 to separate from the layer 26 in the form of a strip defined at its side by the die cuts 34. This exposes a portion of the foil layer 26 adjacent the open end of the pocket 20. Thereafter, finger pressure may be applied on the pocket 20 to force the product 28 through foil layer 26 thereby forming the hole 40.

The attainment of a bond strength of the seal between layers 30 and 26 which is substantially less than the bond strength of the seal between layers 26 and 18 can be accomplished in a variety of ways. For example, the seal between layers 26 and 30 may be an adhesive bond, may be a poor heat seal due to insufficient temperature, or may be a discontinuous heat seal resulting from a release coating intermittently applied as spots or stripes on layer 30. The tear strengths of layers 18 and 30 are each greater than the tear strength of layer 26.

If at any time one is in doubt as to whether the products 28 are being used in accordance with the prescribed schedule, this is visually ascertainable merely by looking at the package 10. Since the entire carrier layer 18 is preferably made from a transparent polymeric plastic material, the products 28 not yet used are visible whereas the used products render their associated pocket 20 empty.

The instructions for attaining access to the product 28 are preferably not printed on the data layer 12. The sequence of steps for attaining access to the prescribed product 28 as described above should be obvious to an adult but will not be obvious to a child.

The present invention may be embodied in other specific forms without departing from the spirit or essential attributes thereof and, accordingly, reference should be made to the appended claims, rather than to the foregoing specification as indicating the scope of the invention.

We claim:

1. A package comprising a laminate of at least three layers with the third layer containing at least one pocket for receiving a product, the seal between the first and second layers of said laminate having a bond strength less than the bond strength of the seal between said second and third layers, said second layer being between said first and third layers, said first layer being a polymeric plastic having a tear strength substantially greater than the tear strength of said second layer, said third layer having a peripheral notch associated with each pocket, and said second layer being cut transversely adjacent to and spaced from said notch.

2. A package in accordance with claim 1 wherein said first layer having parallel cuts generally perpendicular to said first mentioned cut and on opposite sides of the notch.

3. A package in accordance with claim 2 wherein said third layer is a transparent polymeric plastic thicker than the combined thickness of said first and second layers.

4. A package in accordance with claim 1 wherein said notch is along one edge of said third layer, said cut in said second layer being generally parallel to said edge but shorter than the transverse dimensions of said second layer to control tearing of said second layer when said first layer is peeled back beginning at said notch.

5. A package comprising a data layer having at least one hole therein, a laminate bonded to said data layer, said laminate including at least three layers with the second layer being between the first and third layers, said third layer having a discrete pocket which projects through each hole in the data layer, said third layer having a notch adjacent a side edge thereof, said second layer overlying said notch, said data layer having a separable tab overlying said notch and bonded to said second layer, and means for causing a strip of the first layer to separate from the second layer beginning adjacent said notch when subjected to a pulling force.

6. A package in accordance with claim 5 wherein said second layer is cut parallel to said edge and adjacent said notch, said last mentioned means including cuts perpendicular to said edge and on opposite sides of the notch to define the side edges of the strip of said first layer.

7. A package comprising a data layer having a plurality of holes therein, said data layer having removable tabs at the edge thereof with each tab mating with one of said holes, a laminate bonded to said data layer, said laminate including a carrier layer having a plurality of pockets, each pocket projecting through one of said holes in the data layer, said laminate including a foil layer juxtaposed to the open side of said pockets and bonded to said carrier layer, said laminate including a reinforcing layer bonded to said foil layer, and means for causing a portion of said reinforcing layer to separate from the foil layer by pulling on said tab in a manner which exposes a portion of the foil layer opposite one pocket so that a product in said one pocket may be attained by creating a hole in said portion of the foil layer without disturbing a product in other pockets.

8. A package in accordance with claim 7 wherein said carrier layer has peripheral notches, each tab overlying a notch in the carrier layer and being bonded to said foil layer.

9. A package in accordance with claim 8 wherein said foil layer is cut adjacent each notch in a direction generally transverse to the side edges of the strip of the first layer.

10. A package in accordance with claim 7 wherein said data layer has data applied thereto adjacent one hole and different data adjacent a second hole so as to define a dosage schedule.

11. A package in accordance with claim 7 wherein said carrier layer has peripheral notches, each tab overlying a notch in the carrier layer and being bonded to said foil layer, said foil layer having a transverse cut adjacent each notch, said reinforcing layer having a pair of parallel cuts on opposite sides of each pocket generally perpendicular to the cuts in said foil layer, each of said removable tabs being located between a pair of cuts in said reinforcing layer.

* * * * *